(No Model.)

E. G. JENNINGS.
COLLAPSIBLE COOKING UTENSIL.

No. 561,167. Patented June 2, 1896.

Witnesses.
E. T. Wray.
Donald M. Carter.

Inventor.
Estelle G. Jennings.
by Francis W. Parker,
her Atty.

UNITED STATES PATENT OFFICE.

ESTELLE G. JENNINGS, OF CHICAGO, ILLINOIS.

COLLAPSIBLE COOKING UTENSIL.

SPECIFICATION forming part of Letters Patent No. 561,167, dated June 2, 1896.

Application filed October 26, 1895. Serial No. 567,224. (No model.)

*To all whom it may concern:*

Be it known that I, ESTELLE G. JENNINGS, a citizen of the United States, residing at Chicago, in the county of Cook and State of Illinois, have invented certain new and useful Improvements in Collapsible Cooking Utensils, of which the following is a specification.

My invention relates to collapsible cooking utensils, and has for its object to provide a new and improved cooking utensil which can be easily and quickly collapsed so as to take up very little space.

My invention is illustrated in the accompanying drawings, wherein—

Figure 1:
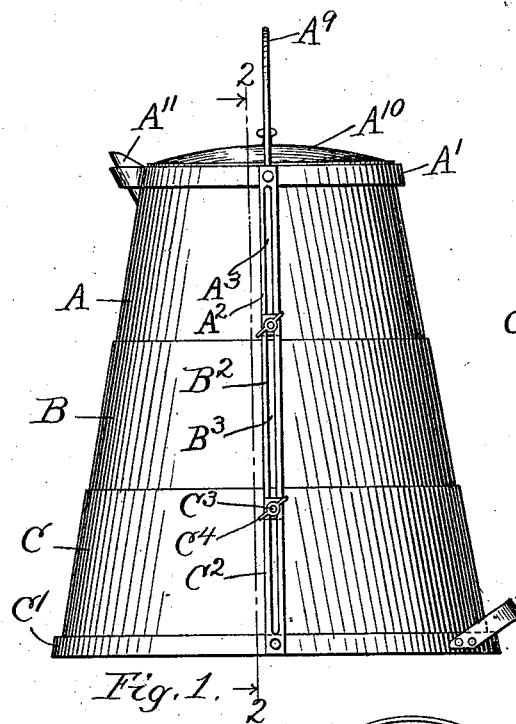
Figure 3:
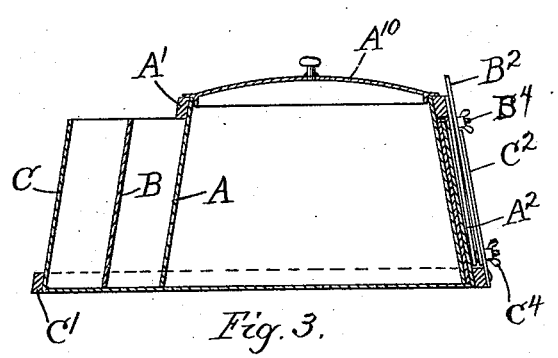
Figure 2:
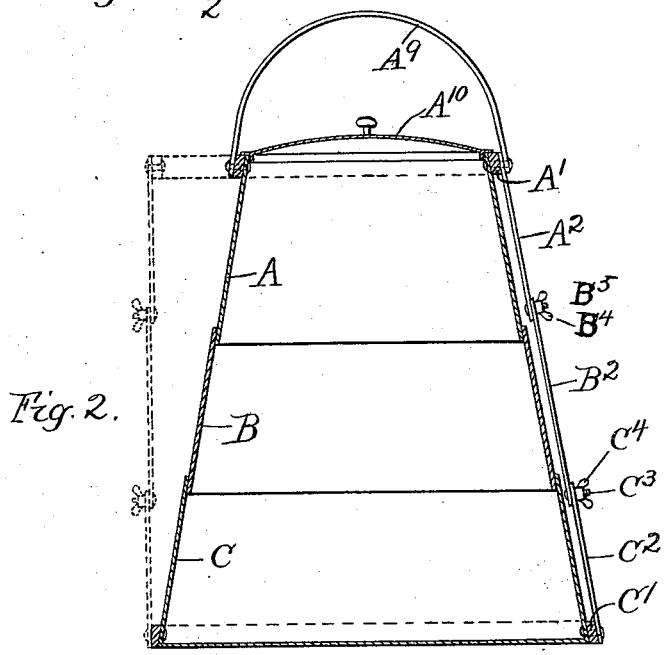
Figure 4:
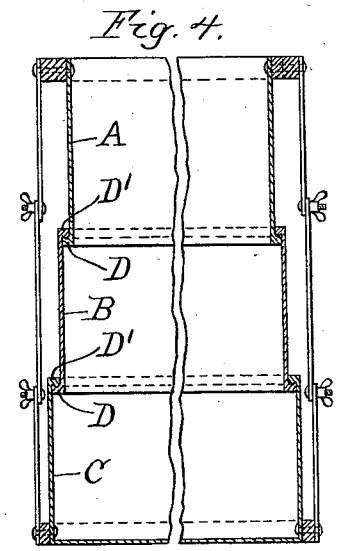

Figure 1 is a side view of a cooking utensil embodying my invention. Fig. 2 is a section on line 2 2, Fig. 1. Fig. 3 is a section through the utensil when in a collapsed position. Fig. 4 is a section of a utensil having substantially vertical sides.

Like letters refer to like parts throughout the several figures.

The device shown in Figs. 1, 2, and 3 consists of three sections A, B, and C, inserted one within the other, each section being cone-shaped, as shown. Connected to the bottom section C is a ring $C'$, and connected to the top section A is a similar ring $A'$. Fastened to the ring $A'$ is a side rod or bar $A^2$, provided with the slot $A^3$, extending almost its entire length. Connected with the end of the bar $A^2$ is a similar bar $B^2$, provided with a similar slot $B^3$. The bars are connected together by means of the bolt $B^4$, said bolt provided with the nut $B^5$. A third rod $C^2$, similar to rods $A^2$ and $B^2$, is connected with the rod $B^2$ by means of the bolt $C^3$, said bolt being provided with the nut $C^4$. The bar $C^2$ is fastened in any convenient manner to the ring $C'$. The handle $A^9$ is connected to the upper section A in any convenient manner, and said section is also provided with a lid $A^{10}$ and, if desired, a spout $A^{11}$. The lower section C is provided with a bottom, which acts as the bottom of the utensil.

The three sections A, B, and C are so shaped that when they are extended the lower end of the section D will make a tight joint with the upper end of the section C and the lower end of the section A will make a tight joint with the upper end of section B.

As shown in Fig. 4, the sections A, B, and C are straight instead of being cone-shaped. The lower end of section A is provided with the projecting ring D, which is preferably provided with a groove into which fits a projection on the ring $D'$, connected with the upper end of the section B. The lower end of section B is also provided with a projecting ring D and the upper end of section C with the projecting ring $D'$. When the sections are extended, these projecting rings fit tightly together, so as to form a water-tight joint. If necessary, packing of some description may be used in connection with these rings, and such packing may also be used when the cone-shaped sections are used, if desired. I have shown in the drawings a utensil consisting of three sections; but it is evident that I may use a larger or smaller number of sections, if desired. When the utensils are large in size, an additional folding side bar may be attached thereto, as shown in dotted lines in Fig. 2, or such utensil may be made in the shape shown in Fig. 4. Said latter construction is preferred in the case of large utensils. I have described these several parts in detail; but it is evident that they may be varied in form, construction, and arrangement without departing from the spirit of my invention, and I therefore do not wish to be limited to the construction shown.

The use and operation of my invention are as follows:

When the vessel is in the collapsed position shown in Fig. 3, it occupies very little space. If, now, it is desired to extend the vessel so that it may be used as a cooking utensil, the nuts $B^5$ and $C^4$ are loosened. The three sections may now be extended so as to form a vessel like that shown in Fig. 1. The nuts $B^5$ and $C^4$ are now tightened and the vessel will then be held rigidly in its extended position and will be ready for use. Before tightening the nuts $B^5$ and $C^4$ the sections are extended as far as possible, so as to insure a tight joint between the ends of the adjacent sections. When it is desired to again collapse the vessel, the nuts $B^5$ and $C^4$ are loosened and the bars $A^2$, $B^2$, and $C^2$ will slide along each other and the parts will take the position shown in Fig. 3.

It will be seen that a vessel constructed as herein described can be easily and quickly collapsed, so as to occupy a very small space, and hence will be very useful for camping expeditions or the like where space for packing materials becomes an important factor.

I claim—

1. A collapsible cooking utensil comprising two or more sections adapted to engage each other when extended and form tight joints between the sections, and a collapsible supporting rod or bar permanently connected with the utensil so as to be a part thereof and adapted to hold said sections in an extended position.

2. A collapsible cooking utensil comprising two or more sections adapted to engage each other when extended so as to form tight joints between the sections, a collapsible supporting device for said sections consisting of a series of rods or bars movably connected together, the end bars of the series being rigidly connected to the outer or end sections, one to each section, and means associated with said bars by which they may be locked in an extended position.

3. A collapsible cooking utensil comprising two or more sections adapted to be collapsed, said sections so constructed that when fully extended their adjacent ends engage each other so as to form a tight joint, a collapsible supporting device for said sections consisting of a series of rods or bars provided with slots extending a greater portion of the length, said bars connected together by regulable screws or bolts, the end bars of the series connected respectively with the outer or end sections of the utensil whereby the sections may be rigidly held in an extended position so as to form an operative cooking utensil substantially as described.

4. A collapsible cooking utensil comprising two or more sections adapted to be collapsed, said sections so constructed that when fully extended their adjacent ends engage each other so as to form a tight joint, a ring or band connected to the lower section, and a similar ring or band connected to the upper section, a collapsible supporting device for said sections connected to each of said bands and consisting of a series of rods or bars provided with slots extending the greater portion of their length, a series of regulable screws or bolts passing through said slots and connecting said sections together, the whole so constructed that the sections of the vessel may be rigidly held in an extended position so as to form an operative cooking utensil or the sections of the utensil and the supporting device may be collapsed substantially as described.

ESTELLE G. JENNINGS.

Witnesses:
 DONALD M. CARTER,
 BERTHA C. SIMS.